United States Patent
Huss et al.

(10) Patent No.: US 6,536,276 B2
(45) Date of Patent: Mar. 25, 2003

(54) APPARATUS AND METHOD TO NON-INTRUSIVELY MEASURE THE LEVEL OF LIQUID IN A SEALED CONTAINER

(75) Inventors: Charles G. Huss, Shakopee, MN (US); Mark R. Koosmann, Corcoran, MN (US); Derrick D. Hongerholt, Eagan, MN (US); Eric D. Haugen, Farmington, MN (US); Greg A. Seidel, Eagan, MN (US); Stephen R. Meyer, Savage, MN (US); Gary A. Willms, Cottage Grove, MN (US)

(73) Assignee: Rosemont Aerospace Inc., Burnsville, MN (US)

( * ) Notice: Subject to any disclaimer, the term of this patent is extended or adjusted under 35 U.S.C. 154(b) by 5 days.

(21) Appl. No.: 09/794,703
(22) Filed: Feb. 27, 2001

(65) Prior Publication Data
US 2002/0116998 A1 Aug. 29, 2002

(51) Int. Cl.⁷ .............................................. G01F 23/24
(52) U.S. Cl. ........................ 73/295; 73/304 C; 73/295; 395/458; 395/459
(58) Field of Search ................................ 73/295, 304 C; 374/100; 392/458, 459

(56) References Cited

U.S. PATENT DOCUMENTS

| | | | | |
|---|---|---|---|---|
| 3,161,050 A | | 12/1964 | Exner | 73/295 |
| 3,955,416 A | * | 5/1976 | Waiwood | 340/622 |
| 4,307,606 A | * | 12/1981 | Johnson | 374/189 |
| 4,440,717 A | * | 4/1984 | Bevilacqua et al. | 376/247 |
| 4,774,838 A | * | 10/1988 | Rickson et al. | 331/66 |
| 5,209,115 A | * | 5/1993 | Bond | 219/438 |

* cited by examiner

Primary Examiner—Hezron Williams
Assistant Examiner—André K. Jackson
(74) Attorney, Agent, or Firm—Westman, Champlin & Kelly, P.A.

(57) ABSTRACT

A liquid level sensor used for determining liquid levels in a sealed container includes a heat source bonded to the container, a first temperature sensor mounted on the container adjacent the heat source, and a second temperature sensor mounted on the container spaced from the heat source. The temperatures at the first and second temperature sensors are sensed while the heat source is operating, and the differential in the temperatures is measured and used to control power to the heater. Changes in the differential in temperature between the first and second temperature sensors indicates when the heat conductivity between the first and second temperature sensors changes, due to presence or absence of a liquid in the container at the level of the temperature sensors.

12 Claims, 2 Drawing Sheets

APPARATUS AND METHOD TO NON-INTRUSIVELY MEASURE THE LEVEL OF LIQUID IN A SEALED CONTAINER

BACKGROUND OF THE INVENTION

The present invention relates to determining the level of a liquid or semi-liquid, such as a slurry, in a container, utilizing elements that can be supported on the exterior of the container so that they are isolated from the liquid being measured.

In sealed liquid containers, the determination of the liquid level is important for various operations. It is desired to measured the liquid level without having components that are mounted on the interior of the container, and yet provide accurate indications of the liquid level on the interior. Additionally, when such containers are used in aircraft for various applications, it is necessary to minimize the amount of power consumed, as well as insuring the reliability in many different operating conditions. Level sensing arrangements can be used to indicate one or two desired levels or to provide a substantially continuous level indication.

SUMMARY OF THE INVENTION

The present invention relates to a non-intrusive level sensor assembly for determining the level of a liquid in a container, and a method of carrying out the measurement.

Sealed containers are used for carrying many different liquids, some of which can be highly corrosive, or otherwise hazardous. The ability to measure the level of a liquid is important, and it is desired to provide for the measurement without substantial effects from acceleration.

The present invention uses a heat source, and at least two temperature sensitive elements (also called temperature sensors) mounted on a wall of the tank, preferably on the exterior surface. One temperature sensitive element is adjacent the heat source and the other temperature sensitive element is spaced from the heat source. The temperature sensor adjacent the heat source measures the temperature rise due to the power applied to the heated element.

The heat source adds heat to the tank wall and raises the temperature of the tank wall in the localized area. This temperature is measured by the one adjacent temperature sensitive element. The second one of the temperature sensitive elements or sensors is positioned on the tank wall at a location spaced from the heat source sufficiently so that the temperature in the area of the second temperature sensitive element is not substantially affected by the heat from the heat source. The second sensor is horizontally spaced, at the same vertical level as the heated sensor.

The differential in the temperatures sensed by the two temperature sensitive elements or sensors, changes when the inner surface of the tank wall aligned with the sensors is in contact with a liquid. Liquid conducts heat from the wall so the temperature differential is different when the liquid level is below the sensors and the inner surface of the wall is in contact with a gas or air. The difference in the sensed temperatures can be used as an indication of whether or not the liquid is at or above the level of the temperature sensitive elements. In the form shown, the heat source is driven to generate more heat when there is a liquid at the level of the heated temperature sensitive element to maintain the temperature differential the same as when the liquid level drops below the measuring plane.

When there is liquid on an opposite side of the tank wall from the temperature sensitive element, the heat source will require more power to provide additional heat to maintain the same temperature differential as without liquid at that level, and this change in power requirement is calibrated to indicate that the liquid level is at the temperature sensor pair.

Alternatively, if desired, the changes in the temperature differential can be used for directly indicating whether or not the surface of the wall at the level of the temperature sensitive elements or sensor is in contact with the liquid.

The level sensor of the present invention will operate satisfactorily with tanks made of substantially any material, although the difference in the heat transfer to a liquid or a gas is more pronounced where the tank material is highly heat conductive. The temperature sensitive elements or sensors have to be thermally bonded to the wall, as does the heater, in order to have an efficient operation. The tank shown is oriented horizontally. In some instances, the tank can be upright. The liquid level also can be measured in a tank that is standing vertically.

DETAILED DESCRIPTION OF THE PREFERRED EMBODIMENTS

Figure 1:
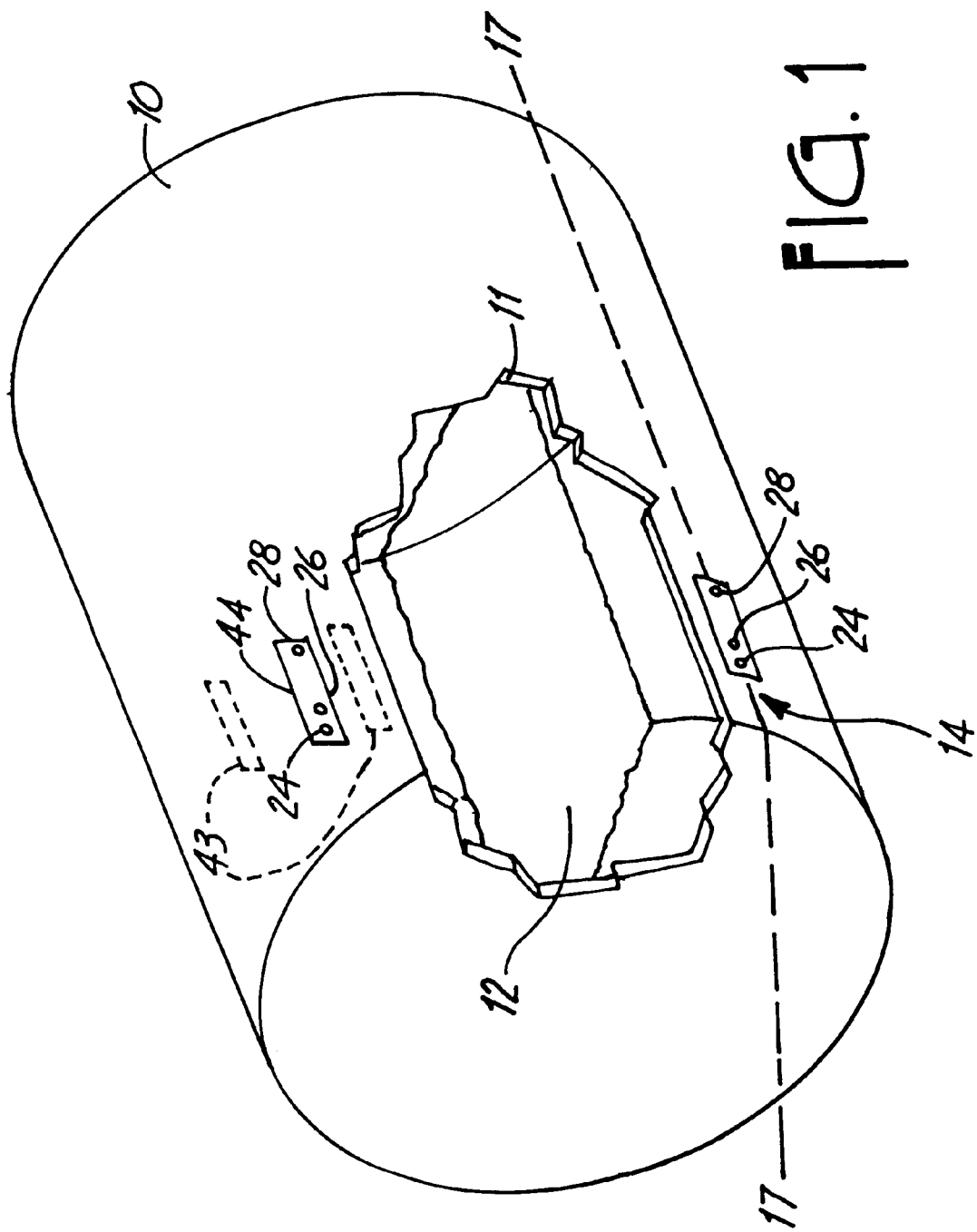
FIG. 1 is a schematic representation of a sealed container having a liquid level measurement arrangement made according to the present invention installed thereon with parts broken away.

A container or tank indicated generally at 10 has, which as shown is sealed, has a wall 11, that is of suitable material. The tank can be made of metal or a composite material, such as carbon fibers, and work satisfactorily. The tank is a circular cylinder as shown with end enclosing walls, and on the interior of the tank there is a liquid 12 that reaches a desired level that is to be measured by the non-intrusive level measuring apparatus or system 14 on the exterior of the tank 10. The level sensing of the liquid 12 in the tank 10 is based on the difference in heat transfer characteristics when the contents inside the tank or container 10 are in contact with the inside surface of the wall 11 at a measurement level, as opposed to when the inside surface is exposed to a gas which is above the liquid level 16.

The illustrative embodiment, as shown, has sensors for determining two levels, a lower level, and a full level. In some applications only one level indicator is used, as for example when the tank is first filled with a quantity of one liquid. The level measuring apparatus or level indicator 14 includes a heat source, or heat producing device, such as a resistance heater shown at 24, and a first temperature sensitive element or sensor shown at 26 that is adjacent to the heater 24. The heat source 24 and first temperature sensitive element 26 are near the bottom of the tank. The temperature of the wall 11 of the tank 10 that is measured by the first temperature sensitive element 26, which is in intimate contact with the outer surface of the tank wall 11, is affected substantially by the heater 24, which also is intimately bonded to the outer surface of the tank wall 11.

A second temperature sensitive element or sensor is indicated at 28, and it is spaced from the heat source or heater 24, so that the heat source 24 has little direct effect on the wall temperature sensed by the second temperature sensitive element or sensor 28. The second temperature sensitive element 28 is on the measuring plane of the tank, that is, it is at the same level as the temperature sensitive element 26.

The amount of heat generated by the heat source, as well as the spacing between the first and second temperature sensitive elements or sensors can affect the degree to which the second temperature sensitive element or sensor 28 is affected by the heater. The difference in temperature between temperature sensitive elements 26 and 28 is used as a signal to control the heater so the temperature differential is maintained at a substantially fixed level.

The second temperature sensitive elements or sensors can be thermocouples or other small temperature sensors that can be spaced at close vertical intervals if desired for obtaining a substantially continuous level reading. The temperature difference between the first and second temperature sensors when liquid is on an inner side of the wall, and when the liquid has dropped below a measurement plane, will be sufficiently different so that a control indication of level can be achieved. A dotted line 17 indicates a liquid level below the level shown in FIG. 2 by the second temperature sensor.

Instead of having separate temperature sensors, the first and second temperature sensitive elements can be modified by using a cold junction of a thermocouple as the second temperature sensitive element 28. The change in thermal conductivity of the backing liquid causes a change in the thermocouple output, which indicates the temperature difference between the two portions of the thermocouple.

Figure 2:
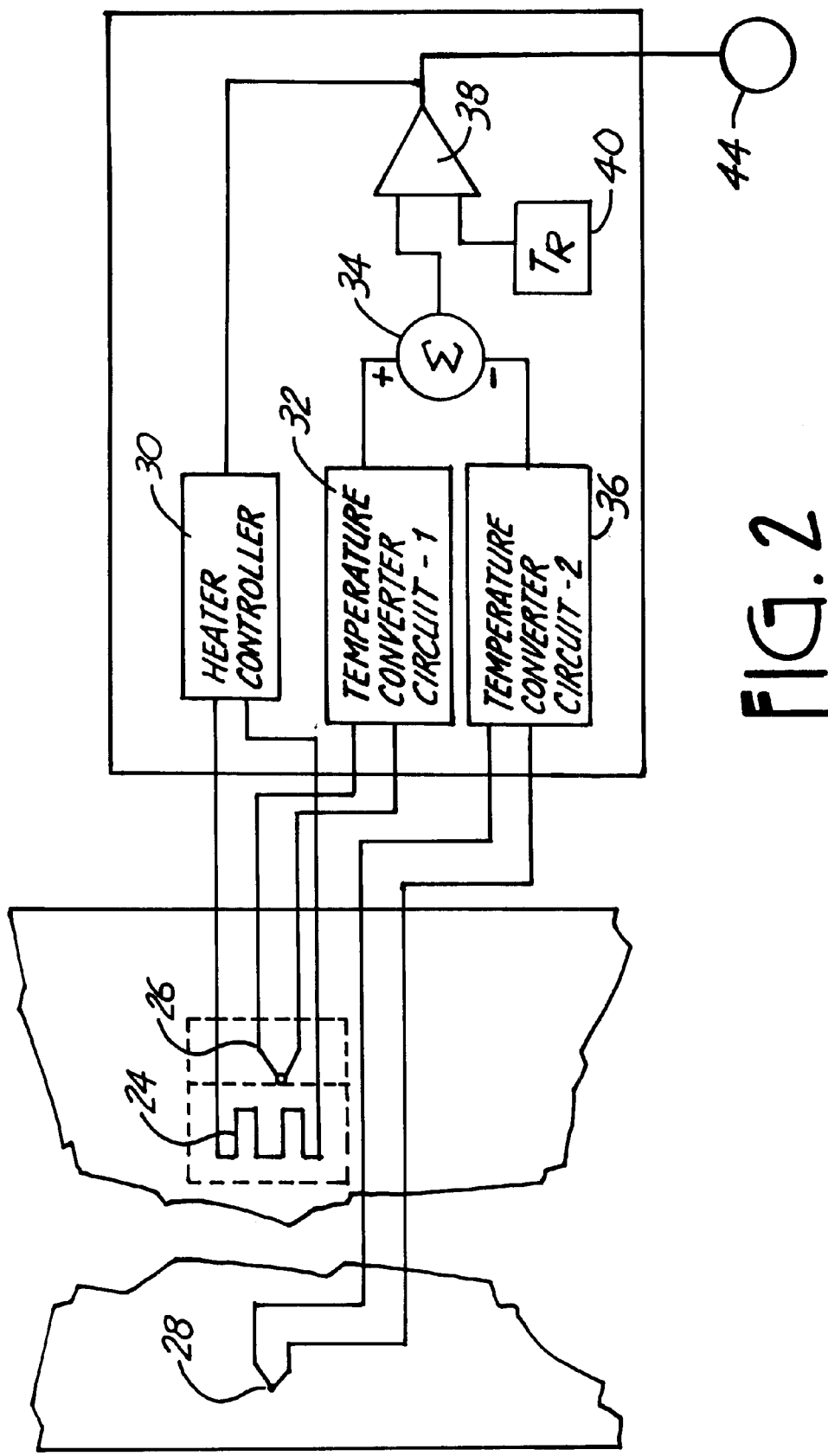
FIG. 2 is a schematic diagram of the control circuit including the heat source and temperature sensitive elements used in FIG. 1 for determining liquid levels in the tank.

Referring to FIG. 2, schematically the first temperature sensitive element or sensor 26 is illustrated adjacent the heater 24. The power to the heater 24 and thus its heat output is controlled with a heater controller 30. The power that is supplied to the heater is varied in response to the temperature differential sensed at the two temperature sensitive elements. The concept is to provide sufficient power so that a known differential in temperature between the first and second temperature sensitive elements or sensors will be maintained. As disclosed, the first temperature sensitive element 26 is connected to a temperature converter circuit, indicated at 32. This can be a signal conditioning circuit that provides an output at a desired level for summing at a summing junction 34 with an output from a second temperature converter circuit 36 that is coupled to the second temperature sensitive element or sensor 28.

The summing junction 34 is connected to one input to an operational amplifier 38, that has its other input connected to a reference temperature source indicated at 40, which is set at the temperature differential that is to be maintained. The operational amplifier 38 output is used to drive the heater controller 30, so that the more differential in the signals between the output of the summing junction 34 and the reference temperature signal from source 40, will result in more power being provided to the heater 24 by the controller 30 and more heat added to the wall 11.

When the differential in the outputs from the converter circuit 32 and the converter circuit 36 are at the selected level, the output from the summing circuit or summing junction 34 will match that of the reference differential temperature from source 40, and the heater controller will cause the heater to dissipate less heat. As more heat from heater 24 is conducted away because of liquid on the opposite side of the wall 11 of the tank, the power that is necessary to maintain the desired differential in temperatures between the first and second temperature sensors increases, because the output from the operational amplifier 38 will increase.

The amplifier signal can go to an upper level indicator 44 that will indicate that the liquid is at that level in the tank. The circuit for indicator 44 can be selected to provide an output as a direct reading of gallons, or percent of full. Additional level indicator, such as those shown in dotted lines at 43, each with a heater and two temperature sensitive elements can be placed at desired locations to show a series of levels. Indicator lights could be used as outputs, as well.

Only one level indicator comprising a set of a heater and two temperature sensors to indicate when liquid reaches a desired level can be used on a tank, if desired.

One level is indicated with each indicator comprising a heater and first and second temperature sensitive elements. On an upright tank the second temperature sensitive element is spaced circumferentially from the heater and first temperature sensitive element.

Although the present invention has been described with reference to preferred embodiments, workers skilled in the art will recognize that changes may be made in form and detail without departing from the spirit and scope of the invention.

What is claimed is:

1. A liquid level sensor for a container having a wall surrounding a chamber containing a liquid, a heat source on said wall at a first location, a first temperature sensitive element mounted on the wall adjacent to the heat source, a second temperature sensitive element mounted on the wall at a location spaced from the first temperature sensitive element a sufficient distance such that the heat from the heat source has a lesser effect at the location of the second temperature sensitive element than at the location of the first temperature sensitive element, wherein the he at source and the first and second temperature sensitive elements, comprise a level indicator set and wherein there are a plurality of level indicator set elements mounted on the tank at vertically spaced locations, and circuits coupled to the first and second temperature sensitive elements of each level indicator set for determining and providing an output indicating the temperature differential between the first and second temperature sensitive elements of the respective level indicator set.

2. The apparatus of claim 1, wherein the temperature sensitive elements comprise individual temperature sensors.

3. The apparatus of claim 1, wherein said temperature sensitive elements comprise thermocouple elements.

4. A liquid level sensor for a container having a wall surrounding a chamber containing a liquid, a heat source on said wall at a first location , a first temperature sensitive element mounted on the wall adjacent to the heat source, a second temperature sensitive element mounted on the wall at a location spaced from the first temperature sensitive element a sufficient distance such that the he at from the heat source has a lesser effect at the location of the second temperature sensitive element than at the location of the first temperature sensitive element, and a circuit coupled to the temperature sensitive elements for determining the temperature differential between the first and second temperature sensitive elements and providing an output indicating the temperature different, wherein the circuit coupled to the temperature sensitive elements comprises a separate coupling to said first temperature sensitive element and said second temperature sensitive element, respectively, for providing signals indicating the temperature sensed by each of the temperature sensitive elements, said separate signals being summed to provide the output indicating the temperature differential between the first and second temperature sensitive elements, and a comparator for comparing the summed signals indicating temperature differential with a reference signal and providing the output as a signal for controlling power to the heat source.

5. The liquid level sensor of claim 4, wherein said output comprises an electrical signal proportional to the temperature differential between the first and second temperature sensitive elements.

6. The liquid sensor of claim 5, further comprising a power controller controlling power to the heat source, said electrical signal being provided to the controller to control the heat source to maintain a known temperature differential between the first and second temperature sensitive elements, as a function of heat conductivity between the first and second temperature sensitive elements.

7. The liquid level sensor of claim 4, wherein said heat source comprises a resistance heater mounted in thermal conducting a relationship to an exterior surface of said container.

8. The liquid level sensor of claim 4, wherein said container is a sealed container containing a liquid, the liquid having an upper surface interfacing with a gas above the liquid.

9. The liquid level sensor of claim 4, wherein said comparator comprises an operational amplifier that outputs a signal proportional to the difference between the summed signal and the reference signal.

10. The liquid level sensor of claim 9, and an indicator for indicating the level of said signal from the operational amplifier.

11. A method of determining the presence of a liquid at a level in a container for the liquid, comprising mounting a heat source on a wall of the first container at a first location, mounting a first temperature sensitive element on the container wall adjacent the heat source, mounting a second temperature sensitive element on the container wall spaced from the heat source and the first temperature sensitive element, and determining changes in the difference in temperature between the first and second temperature sensitive elements as the level of liquid changes, wherein the determining changes in the difference in temperature comprises providing separate signals indicating the temperature at each temperature sensitive element, summing the separate signals, and comparing the summed signals to a reference to provide a control signal for the heat source.

12. The method of claim 11, including controlling the heat provided by the heat source to maintain the difference in temperature at substantially a constant difference.

* * * * *